(12) United States Patent
Lagnado

(10) Patent No.: US 7,822,412 B2
(45) Date of Patent: Oct. 26, 2010

(54) SYSTEM AND METHOD FOR ACCESSING A WIRELESS NETWORK

(75) Inventor: Isaac Lagnado, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1052 days.

(21) Appl. No.: 10/829,067

(22) Filed: Apr. 21, 2004

(65) Prior Publication Data
US 2005/0239463 A1  Oct. 27, 2005

(51) Int. Cl.
H04W 4/00 (2009.01)
(52) U.S. Cl. .................. 455/422.1; 455/435.2; 370/338
(58) Field of Classification Search .............. 455/435.2, 455/410, 435.1, 434, 422.1, 41.2, 574, 343.2; 370/338, 328
See application file for complete search history.

(56) References Cited

U.S. PATENT DOCUMENTS

| | | | |
|---|---|---|---|
| 6,970,705 B2 * | 11/2005 | Yoshimoto et al. | 455/435.2 |
| 7,024,218 B2 * | 4/2006 | Bender | 455/522 |
| 7,076,256 B1 * | 7/2006 | Orler et al. | 455/456.1 |
| 7,340,615 B2 * | 3/2008 | Krantz et al. | 713/300 |
| 7,346,338 B1 * | 3/2008 | Calhoun et al. | 455/411 |
| 2002/0101218 A1 | 8/2002 | Koenck et al. | |
| 2002/0102978 A1 * | 8/2002 | Yahagi | 455/437 |
| 2002/0110105 A1 | 8/2002 | Awater et al. | |
| 2002/0176437 A1 | 11/2002 | Busch et al. | |
| 2003/0012163 A1 | 1/2003 | Cafarelli et al. | |
| 2003/0037033 A1 | 2/2003 | Nyman et al. | |
| 2003/0119481 A1 * | 6/2003 | Haverinen et al. | 455/411 |
| 2003/0134650 A1 * | 7/2003 | Sundar et al. | 455/465 |
| 2003/0158922 A1 | 8/2003 | Park | |
| 2003/0221006 A1 | 11/2003 | Kuan et al. | |
| 2003/0224797 A1 | 12/2003 | Kuan et al. | |
| 2003/0235164 A1 * | 12/2003 | Rogers et al. | 370/331 |
| 2004/0003285 A1 * | 1/2004 | Whelan et al. | 713/201 |
| 2004/0023640 A1 | 2/2004 | Ballai | |
| 2004/0039817 A1 | 2/2004 | Lee et al. | |
| 2004/0047323 A1 * | 3/2004 | Park et al. | 370/338 |
| 2004/0072588 A1 * | 4/2004 | Beach et al. | 455/550.1 |
| 2004/0110530 A1 * | 6/2004 | Alone et al. | 455/552.1 |
| 2004/0153676 A1 * | 8/2004 | Krantz et al. | 713/300 |
| 2005/0048986 A1 * | 3/2005 | Zhao et al. | 455/456.1 |
| 2005/0136837 A1 * | 6/2005 | Nurminen et al. | 455/41.2 |
| 2005/0148299 A1 * | 7/2005 | Buckley | 455/41.2 |

FOREIGN PATENT DOCUMENTS

| | | |
|---|---|---|
| JP | 2003-274454 A | 9/2003 |
| WO | WO 03/003610 | 1/2003 |
| WO | WO 2004/014024 | 2/2004 |

OTHER PUBLICATIONS

Fout, Tom, "Microsoft Window s.XP, Operating System, Wireless LAN Technologies and Window s XP", Microsoft Corporation, Jul. 2001; 19 pgs.
Mei Yen Cheong, "Management Operations of the IEEE 802.11", S-72.333 Postgraduate Seminar On Radio Communciations, Apr. 13, 2004, pp. 32.
EP Office Action dated Mar. 3, 2010, p. 5.

* cited by examiner

Primary Examiner—George Eng
Assistant Examiner—Brandon J Miller

(57) ABSTRACT

A method for accessing a wireless network comprises detecting at least one wireless network within which a wireless device is located while the wireless device in a transmit off mode. The method also comprises determining whether the at least one wireless network is on a list of requested wireless networks.

49 Claims, 3 Drawing Sheets

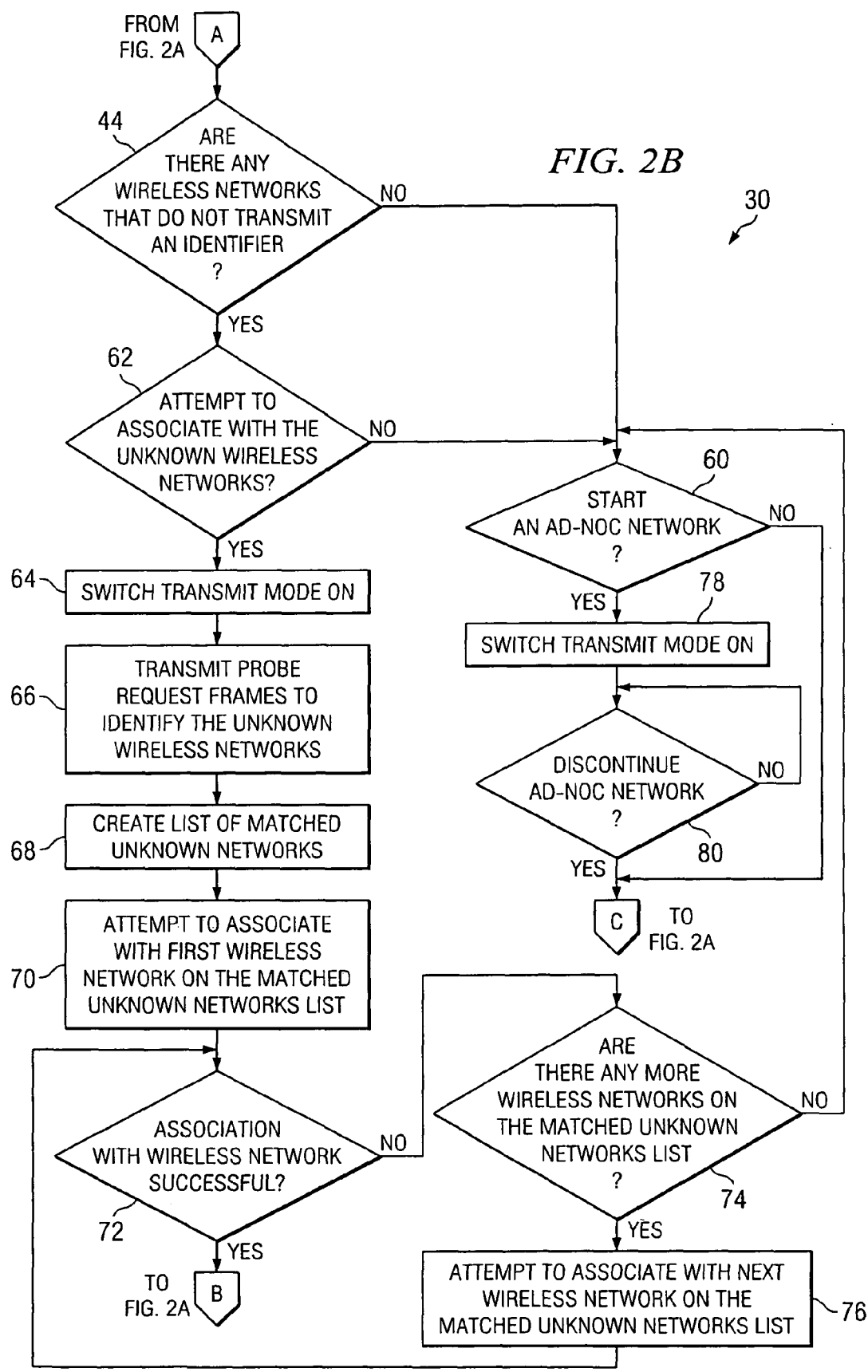

SYSTEM AND METHOD FOR ACCESSING A WIRELESS NETWORK

BACKGROUND

Wireless networks, such as wireless local area networks (LANs), have been developed to work in conjunction with or in place of wired networks, such as wired local area networks. For example, there are two basic types of wireless LANs—infrastructure and ad-hoc. In an infrastructure network, one or more wireless devices communicate directly with a base station or access point. The access point bridges the wireless LAN and a wired communication network and acts as a central controller for the wireless LAN. In an ad-hoc network, a LAN is created by the wireless devices themselves with no central controller. In an ad-hoc network, each device communicates directly with other devices in the network rather than through a central controller.

In a wireless network, air acts as the medium for data transmission. One of the concerns in a wireless network is that the medium over which data is transmitted is open and does not have the same constraints as a wired network. Malicious users can more easily access information traveling through the air. Furthermore, it is easier for malicious users to gain access to the wireless network. Existing wireless devices continually transmit probe requests to determine whether there are any wireless networks with which the wireless device can communicate. The probe request contains information about the type of network the wireless device desires to communicate with as well as information about the wireless device itself. Thus, the wireless device is "visible" to other wireless devices.

A malicious user of a wireless device can intercept these probe requests from other users (or wireless devices) and impersonate a wireless network with which the wireless device desires to communicate. An unsuspecting user (or wireless device) can unknowingly communicate with the impersonating wireless network, thereby enabling a malicious user to access information contained in the wireless device.

SUMMARY

In accordance with an embodiment of the present invention, a method for accessing a wireless network comprises detecting at least one wireless network within which a wireless device is located while the wireless device in a transmit off mode. The method also comprises determining whether the at least one wireless network is on a list of requested wireless networks.

In accordance with another embodiment of the present invention, a method for accessing a wireless network comprises automatically switching a wireless device to a transmit off mode in response to activation of the wireless device and detecting at least one wireless network within which said wireless device is located while the wireless device is in the transmit off mode.

In accordance with yet another embodiment of the present invention, a system for accessing a wireless network comprises a wireless device and application logic operatively associated with the wireless device. The application logic is adapted to selectively switch the wireless device between a transmit on mode and a transmit off mode based on an identification of at least one wireless network.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1A:
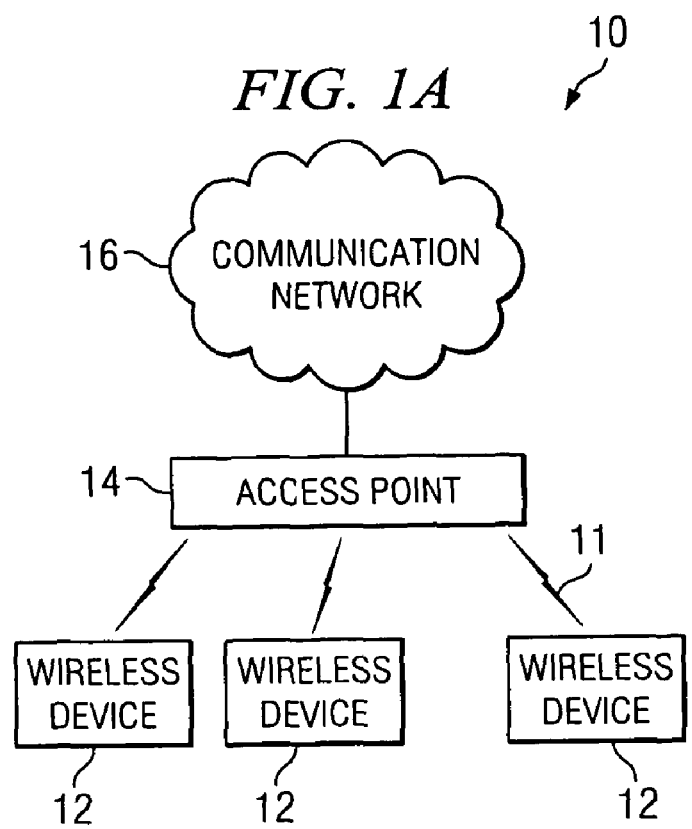
FIG. 1A is a schematic diagram of an exemplary wireless local area network in which embodiments of the present invention may be used to advantage.
Figure 1B:
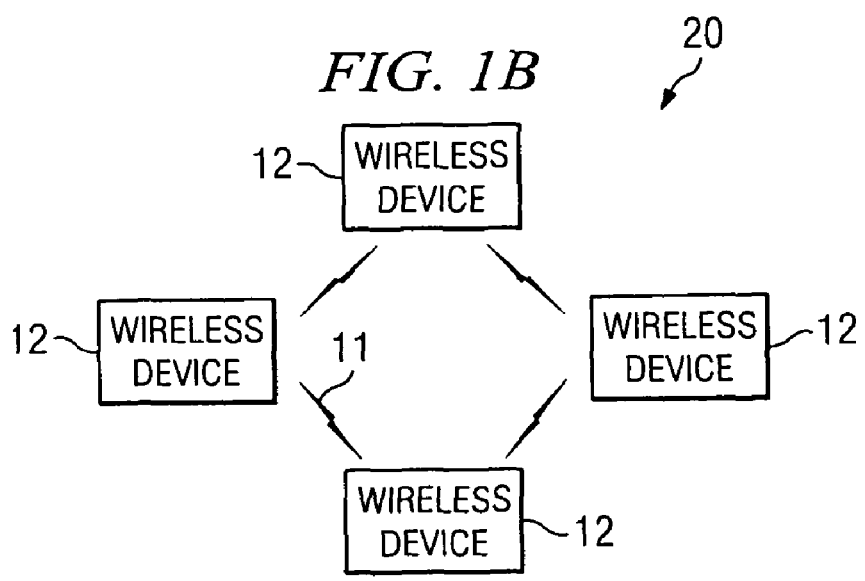
FIG. 1B is a schematic diagram of another exemplary wireless local area network in which embodiments of the present invention may be used to advantage.
Figure 2A:
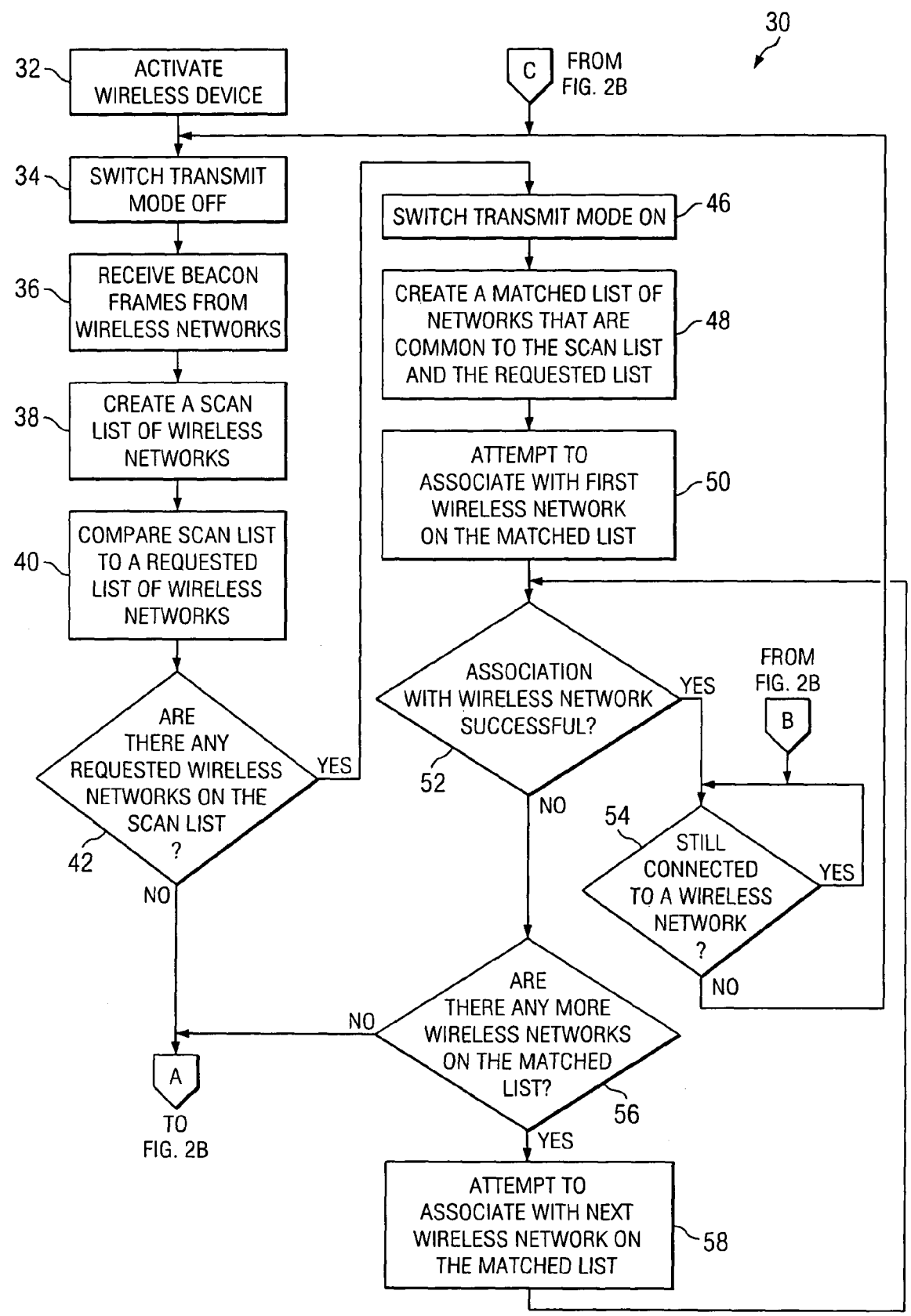
FIG. 2 is a flowchart of an exemplary method for accessing a wireless network in accordance with an embodiment of the present invention.

The preferred embodiment of the present invention and its advantages are best understood by referring to FIGS. 1 and 2 of the drawings.

FIG. 1A is a schematic diagram of an exemplary wireless local area network (WLAN) 10 in which embodiments of the present invention may be used to advantage, and FIG. 1B is a schematic diagram of another exemplary wireless local area network 20 in which embodiments of the present invention may be used to advantage. For convenience, the term "wireless network" is used herein to refer to any type of wireless network such as, but no limited to, a WLAN, a wireless wide area network (WWAN), or any other type of wireless network now known or later developed. Embodiments of the present invention are described below in connection with LANs (as illustrated in FIGS. 1 and 2); however, it should be understood that embodiments of the present invention may be used to advantage in any type of wireless network.

Wireless network 10 is an example of an infrastructure type wireless local area network, and wireless network 20 is an example of an ad-hoc type wireless local area network. Both networks 10 and 20 comprise a plurality of wireless devices 12, for example, a portable computer, a desktop computer, a cellular phone, a personal digital assistant (PDA), a camera, and/or the like. Wireless device 12 comprises a wireless network connectivity component, for example, a PCI (Peripheral Component Interconnect) card, USB (Universal Serial Bus), PCMCIA (Personal Computer Memory Card International Association) card, SDIO (Secure Digital Input-Output) card, NewCard, Cardbus, and/or the like, and is operable to communicate wirelessly with the aid of the wireless network connectivity component with a central controller or access point (AP) 14 or with other wireless devices 12. AP 14 is communicatively coupled with a communication network 16, such as the Internet, an Intranet, an extranet, and/or the like. AP 14 may be coupled with communication network 16 either wirelessly or with the aid of wires.

In an infrastructure network, such as wireless network 10, AP 14 coordinates communication between multiple wireless devices 12 within a predetermined range. The range depends on the wireless network standard being used for communication. The wireless network standard may be any standard now known or later developed, for example IEEE 802.11 standard. In an ad-hoc network, such as wireless network 20, there is no central controller or AP 14 and wireless devices 12 communicate with each other directly rather than through the controller.

FIG. 2 is a flowchart of an exemplary method 30 for accessing a wireless network in accordance with an embodiment of the present invention. At block 32, a wireless device, such as wireless device 12, is activated or switched on. At block 34, a transmit mode of the wireless device 12 is switched off so that the device 12 does not transmit signals. Wireless device 12 may be switched to a transmit off mode in response to a user request or action or may be automatically switched to a transmit off mode in response to or upon activation or another predetermined action or event. If desired, in an alternative embodiment, the transmit mode of the wireless device 12 may be set to an off state by default. In the transmit off mode, the device 12 is operable to receive signals from other devices or wireless networks but does not transmit any signals.

A wireless network periodically transmits a beacon frame that comprises a timestamp and attributes of the wireless network. In an infrastructure network, the beacon frames are transmitted by the access point, and in an ad-hoc network, the beacon frames are transmitted by other wireless devices operating within the ad-hoc network. At block 36, the wireless device 12 receives beacon frames from wireless networks within which the wireless device 12 is positioned. The receipt of the beacon frame aids the wireless device 12 in detecting wireless networks within which the wireless device 12 is located.

At block 38, a scan list of wireless networks is created based at least in part on the received beacon frames. The beacon frames include attributes, for example, an identifier, a media access control ID (MAC ID), a security level, network type, data rate, modulation scheme, and/or the like, of the wireless network. In an exemplary embodiment, the identifier comprises a service set identifier (SSID) associated with the corresponding wireless network. The scan list of wireless networks comprises attributes of the wireless networks from whom the beacon frames have been received. In an exemplary embodiment, the scan list comprises at least one of the following—an identifier, a MAC ID, a security level, network type, data rate, modulation scheme, and/or the like.

At block 40, the scan list is compared to a requested list of wireless networks. In an exemplary embodiment, the requested list is user-configurable and stored in the wireless device 12. The requested list of wireless networks is a list of networks with which the user of the wireless device 12 is willing to associate. The requested list of wireless networks preferably comprises at least one of the following attributes of the wireless networks—an identifier, a MAC ID, a security level, network type, data rate, modulation scheme, and/or the like. In an exemplary embodiment, the requested list of wireless networks comprises both infrastructure networks and ad-hoc networks. If desired, the requested list of wireless networks may comprise only infrastructure networks or only ad-hoc networks.

At block 42, a determination is made as to whether any of the requested wireless networks are on the scan list. In an exemplary embodiment, this determination is made by comparing at least one attribute, for example an SSID, on the scan list and the requested list. In an exemplary embodiment, the determination is made by comparing a set of attributes on the scan list and the requested list. If none of the requested wireless networks are on the scan list, then the process starting at block 44 is executed. If at least one of the requested wireless networks is on the scan list, then the process starting at block 46 is executed.

At block 46, because there is a match in the requested wireless networks and the scanned wireless networks, a transmit mode of the wireless device 12 is switched on so that the wireless device 12 can transmit signals. In an exemplary embodiment, the wireless device 12 only transmits signals selectively, for example, when it has determined that it is within the range of a wireless network on its requested wireless networks list. Because the wireless device 12 transmits signals selectively, the probability of a malicious user impersonating a wireless network based on the information transmitted by the wireless device 12 and thereby creating a connection with the wireless device 12 through a rogue network is substantially reduced or eliminated. At block 48, a matched list of wireless networks that are on the scan list as well as the requested list is created. The list may be arranged in any desirable order. In an exemplary embodiment, the list is arranged based on a user defined priority as specified in the requested list.

At block 50, the wireless device 12 attempts to associate with the first wireless network on the matched list. In an exemplary embodiment, the wireless device 12 transmits an access request, for example, an association request frame, to the first wireless network on the matched list to request permission to associate with the wireless network. After receiving an association request frame, the wireless network transmits an association response frame indicating the result of the association request. The association response frame is received by the wireless device 12. In an exemplary embodiment, after receiving the association response frame, the wireless device 12 initiates an authentication process with the access point. Any method for authentication now known or later developed may be used.

At block 52, a determination is made as to whether the association with the wireless network was successful. If the association with the wireless network was successful, then the process starting at block 54 is executed. If the association with the wireless network was not successful, then the process starting at block 56 is executed.

At block 56, a determination is made as to whether there are any more wireless networks on the matched list. If there are no more wireless networks on the matched list, then the process starting at block 44 is executed. If there are additional wireless networks on the matched list, then at block 58, the wireless device 12 attempts to associate with the next wireless network on the matched list, and the process starting at block 52 is executed.

At block 44, a determination is made as to whether the scan list contains any wireless networks that do not transmit an identifier. For example, some wireless networks transmit a beacon frame but do not include an identifier in the beacon frame for security reasons. Instead of the identifier, such wireless networks transmit a NULL string. Therefore, in an exemplary embodiment, at block 44, a determination is made as to whether the scan list contains any wireless networks with a NULL string as the identifier. If the scan list does not contain any wireless networks with a NULL string as the identifier, then the process starting at block 60 is executed.

If the scan list contains at least one wireless network with a NULL string as the identifier of the wireless network, then it is desirable that the user be informed about the existence of a wireless network whose identity is not known. Therefore, at block 62, the user is notified of the existence of the unidentified wireless network and prompted to select whether the user wants to attempt to associate with the unidentified wireless network. If the user chooses not to attempt to associate with the unidentified wireless network, then the process stating at block 60 is executed.

If the user chooses to attempt to associate with one of the unidentified or unknown wireless networks, then at block 64, a transmit mode of the wireless device 12 is switched on so that the wireless device 12 can transmit signals. In an exemplary embodiment, the wireless device 12 only transmits signals selectively, for example, when the user desires to attempt to associate with an unidentified wireless network. Because the wireless device transmits signals selectively, the probability of a malicious user impersonating a wireless network based on the information transmitted by the wireless device 12 and thereby creating a connection with the wireless device 12 through a rogue network is substantially reduced or eliminated.

At block 66, the wireless device transmits probe request frames to identify the unknown wireless networks. In response to receiving the probe request frames, the wireless network will transmit probe response frames. The probe response frame comprises information identifying the wireless networks transmitting the probe response frame, for example, an identifier, a MAC ID, a security level, network type, data rate, modulation scheme, and/or the like. The probe response frame is received by the wireless device 12. At block 68, a list of matched unknown networks is created. The list of matched unknown networks comprises a list of previously unknown networks that are also on the requested list of networks. In an exemplary embodiment, the list of matched unknown networks is created by comparing the identifiers received from the wireless networks with identifiers in the requested list of networks. The list may be arranged in any desirable order. In an exemplary embodiment, the list is arranged based on a user defined priority.

At block 70, the wireless device 12 attempts to associate with the first wireless network on the matched unknown networks list. In an exemplary embodiment, the wireless device 12 transmits an access request, for example, an association request frame, to the first wireless network on the matched unknown networks list to request permission to associate with the wireless network. After receiving an association request frame, the wireless network transmits an association response frame indicating the result of the association request. The association response frame is received by the wireless device 12. In an exemplary embodiment, after receiving the association response frame, the wireless device 12 initiates an authentication process with the access point. Any method for authentication now known or later developed may be used.

At block 72, a determination is made as to whether the association with the wireless network was successful. If the association with the wireless network was successful, then the process starting at block 54 is executed. If the association with the wireless network was not successful, then the process starting at block 74 is executed.

At block 74, a determination is made as to whether there are any more wireless networks on the matched unknown networks list. If there are no more wireless networks on the matched unknown networks list, then the process starting at block 60 is executed. If there are additional wireless networks on the matched unknown networks list, then at block 76, the wireless device 12 attempts to associate with the next wireless network on the matched unknown networks list and the process starting at block 72 is executed.

If the attempted association with a wireless network is successful at block 52 or block 72, then the process starting at block 54 is executed. The wireless device 12 may become disconnected from the wireless network due to a number of reasons, for example, de-authentication of the wireless network or wireless device 12, change of wireless device 12 configuration by the user, and/or the like. At block 54, a determination is made as to whether the wireless device 12 is still connected to the wireless network. If the wireless device 12 is not connected to the wireless network, then it is desirable to switch off the transmit mode of the wireless device 12. Therefore, the process starting at block 34 is executed.

At block 60, the user is prompted to select whether the user would like to start an ad-hoc network. If the user selects not to start an ad-hoc network, then the process starting at block 34 is executed. If the user selects to start an ad-hoc network, then at block 78, a transmit mode of the wireless device 12 is switched on so that the wireless device can transmit signals. In an exemplary embodiment, the wireless device 12 only transmits signals selectively, for example, when the user selects to start an ad-hoc network. Because the wireless device 12 transmits signals selectively, the probability of a malicious user impersonating a wireless network based on the information transmitted by the wireless device 12 and thereby creating a connection with the wireless device 12 through a rogue network is substantially reduced or eliminated.

At block 80, a determination is made as to whether the ad-hoc network should be discontinued. If the ad-hoc network is to be discontinued, then the process starting at block 34 is executed. Otherwise, the wireless device operates within an ad-hoc network until the ad-hoc network is discontinued.

Embodiments of the present invention may be implemented in software, hardware, application logic or a combination of software, hardware and application logic. The software, application logic and/or hardware may reside on wireless device 12. The application logic, software or an instruction set is preferably maintained on any one of various conventional computer-readable mediums. In the context of this document, a "computer-readable medium" can be any means that can contain or store the program for use by or in connection with an instruction execution system, apparatus, or device.

If desired, the different functions discussed herein may be performed in any order and/or concurrently with each other. Furthermore, if desired, one or more of the above-described functions may be optional or may be combined without departing from the scope of the present invention.

A technical advantage of an exemplary embodiment of the present invention is that additional security is provided to the wireless device because the wireless device selectively transmits signals only upon the occurrence of certain events. Another technical advantage of an exemplary embodiment of the present invention is that a transmit mode of the wireless device may be switched off to prevent unauthorized access of the wireless device while the wireless device remains "on" or in an activated state.

What is claimed is:

1. A method for accessing a wireless network, comprising:
   detecting at least one wireless network within which a wireless device is located while the wireless device in a transmit off mode; and
   determining whether the at least one wireless network is on a list of requested wireless networks;
   in response to a determination that the at least one wireless network is on the list of requested wireless networks, switching the wireless device from the transmit off mode to a transmit on mode; and
   determining whether the at least one wireless network is a wireless network whose identifier is unknown.

2. The method of claim 1, wherein detecting comprises receiving at least one beacon frame from the at least one wireless network.

3. The method of claim 1, further comprising switching the wireless device to a transmit on mode and transmitting an access request to the at least one wireless network in response to determining that the at least one wireless network is on the list of requested wireless networks.

4. The method of claim 1, further comprising creating a scan list of wireless networks within which the wireless device is located.

5. The method of claim 4, wherein the scan list comprises an identifier of the at least one wireless network.

6. The method of claim 4, wherein the scan list comprises an identifier having a service set identifier (SSID).

7. The method of claim 4, the scan list comprising a set of attributes of the at least one wireless network.

8. The method of claim 1, wherein determining comprises comparing a set of attributes of a scan list associated with the at least one wireless network with a set of attributes in the list of requested wireless networks.

9. The method of claim 1, wherein determining whether the at least one wireless network is on the list of requested wireless networks comprises comparing a scan list associated with the list of requested wireless networks.

10. The method of claim 1, further comprising switching the wireless device to a transmit on mode to identify the unknown wireless network.

11. The method of claim 1, further comprising transmitting at least one probe request frame to identify the unknown wireless network.

12. The method of claim 1, further comprising receiving a probe response frame from the unknown wireless network, the probe response frame having an identifier for identifying the unknown wireless network.

13. The method of claim 1, wherein detecting comprises detecting at least one wireless local area network within which the wireless device is located.

14. A method for accessing a wireless network, comprising:
automatically switching a wireless device to a transmit off mode in response to activation of the wireless device;
detecting at least one wireless network within which said wireless device is located while the wireless device is in the transmit off mode;
determining whether the at least one wireless network is on a list of requested wireless networks; and
in response to a determination that the at least one wireless network is on the list of requested wireless networks, switching the wireless device from the transmit off mode to a transmit on mode.

15. The method of claim 14, further comprising determining whether the at least one wireless network is a wireless network whose identifier is unknown.

16. The method of claim 14, wherein detecting comprises receiving at least one beacon frame from the at least one wireless network.

17. The method of claim 14, further comprising creating a scan list of wireless networks within which the wireless device is located.

18. The method of claim 14, further comprising comparing a list of requested wireless networks with a scan list of wireless networks within which the wireless device is located.

19. The method of claim 14, wherein detecting comprises detecting at least one wireless local area network within which said wireless device is located.

20. The method of claim 14, further comprising:
switching the wireless device to a transmit on mode in response to determining that the at least one wireless network is a wireless network whose identifier is unknown; and
transmitting a probe request frame to the at least one wireless network to identify the at least one wireless network.

21. The method of claim 14, further comprising requesting access to the at least one wireless network in response to determining that the at least one wireless network is on a list of requested wireless networks.

22. A system for accessing a wireless network, comprising:
a wireless device; and
application logic operatively associated with the wireless device and adapted to:
switch the wireless device to a transmit off mode;
detect at least one wireless network within which the wireless device is located while in the transmit off mode;
determine whether the at least one wireless network is on a predetermined list of requested wireless networks;
in response to a determination that the at least one wireless network is on the list of requested wireless networks, switching the wireless device from the transmit off mode to a transmit on mode; and
switch the wireless device to a transmit on mode and transmit a probe request frame in response to determining that the at least one wireless network is a wireless network whose identifier is unknown.

23. The system of claim 22, wherein the application logic is adapted to determine whether the at least one wireless network is on the list of requested wireless networks.

24. The system of claim 22, wherein the application logic is adapted to switch the wireless device to the transmit on mode and transmit an access request to the at least one wireless network in response to determining that the at least one wireless network is on a list of requested wireless networks.

25. The system of claim 22, wherein the application logic is adapted to receive at least one beacon frame from the at least one wireless network.

26. The system of claim 22, wherein the application logic is adapted to create a scan list of wireless networks within which the wireless device is located.

27. The system of claim 26, the scan list comprising a set of attributes of the at least one wireless network.

28. The system of claim 22, wherein the application logic is adapted to compare a scan list associated with a list of requested wireless networks to a scan list associated with the at least one wireless network to determine whether the at least one wireless network is on the list of requested wireless networks.

29. The system of claim 22, wherein the application logic is adapted to determine whether the at least one wireless network is a wireless network whose identifier is unknown.

30. The system of claim 22, wherein the application logic is adapted to detect at least one wireless local area network within which the wireless device is located while in the transmit off mode.

31. A system for accessing a wireless network, comprising:
means for switching a wireless device to a transmit off mode;
means for detecting at least one wireless network within which the wireless device is located while in the transmit off mode;
means for determining whether the at least one wireless network is on a predetermined list of requested wireless networks;
means for, in response to a determination that the at least one wireless network is on the list of requested wireless networks, switching the wireless device from the transmit off mode to a transmit on mode; and
means for switching the wireless device to a transmit on mode and transmitting a probe request frame in response to determining that the at least one wireless network is a wireless network whose identifier is unknown.

32. The system of claim 31, further comprising means for determining whether the at least one wireless network is on a list of requested wireless networks.

33. The system of claim 31, further comprising means for creating a scan list of wireless networks within which the wireless device is located.

34. A system for accessing a wireless network, comprising:
a wireless device; and
application logic operatively associated with the wireless device, the application logic adapted to selectively switch the wireless device between a transmit on mode and a transmit off mode based on an identification of at least one wireless network, the application further configured to determine whether the at least one wireless network is on a list of requested wireless networks, the application logic further configured to, in response to a determination that the at least one wireless network is on the list of requested wireless networks, switch the wireless device from the transmit off mode to the transmit on mode.

35. The system of claim 34, wherein the at least one wireless network comprises an wireless local area network.

36. The system of claim 34, wherein the at least one wireless network comprises an infrastructure wireless network.

37. The system of claim 34, wherein the at least one wireless network comprises an ad-hoc wireless network.

38. The system of claim 34, wherein the application logic is adapted to switch the wireless device to the transmit on mode if the at least one wireless network corresponds to a list of requested wireless networks.

39. The system of claim 34, wherein the application logic is adapted to create a scan list of wireless networks within which the wireless device is located.

40. The system of claim 39, wherein the application logic is adapted to switch the wireless device to the transmit on mode if at least one of the scan list wireless networks corresponds to a list of requested wireless networks.

41. The system of claim 34, wherein the application logic is adapted to switch the wireless device to the transmit on mode to transmit a probe request frame to identify at least one wireless network having an unknown identifier.

42. The system of claim 34, wherein the application logic is adapted to automatically switch the wireless device to the transmit off mode upon activation of the wireless device.

43. The system of claim 34, wherein the application logic is adapted to switch the wireless device to the transmit on mode to transmit an access request to an identified wireless network.

44. A method for accessing a wireless network, comprising:
automatically detecting at least one wireless network within which a wireless device is located while the wireless device is on and in a transmit off mode;
determining whether the at least one wireless network is on the list of requested wireless networks;
in response to a determination that the at least one wireless network is on the list of requested wireless networks, switching the wireless device from the transmit off mode to a transmit on mode; and
determining whether the at least one wireless network is a wireless network whose identifier is unknown.

45. The method of claim 44, further comprising automatically switching the wireless device to a transmit on mode in response to identifying the at least one wireless network.

46. The method of claim 44, further comprising creating a scan list of wireless networks within which the wireless device is located.

47. A system for accessing a wireless network, comprising:
a wireless device; and
application logic operatively associated with the wireless device and adapted to automatically detect at least one wireless network within which the wireless device is located while the wireless device is on and in a transmit off mode, the application logic further configured to determine whether the at least one wireless network is on a list of requested wireless networks, the application logic further configured to, in response to a determination that the at least one wireless network is on the list of requested wireless networks, switch the wireless device from the transmit off mode to a transmit on mode; and
automatically switch the wireless device to a transmit on mode in response to identifying the at least one wireless network.

48. The system of claim 47, wherein the application logic is adapted to automatically determine whether the at least one wireless network is on a list of requested wireless networks.

49. The system of claim 47, wherein the application logic is adapted to create a scan list of wireless networks within which the wireless device is located.

* * * * *

UNITED STATES PATENT AND TRADEMARK OFFICE
CERTIFICATE OF CORRECTION

| | | |
|---|---|---|
| PATENT NO. | : 7,822,412 B2 | Page 1 of 1 |
| APPLICATION NO. | : 10/829067 | |
| DATED | : October 26, 2010 | |
| INVENTOR(S) | : Isaac Lagnado | |

It is certified that error appears in the above-identified patent and that said Letters Patent is hereby corrected as shown below:

In column 7, line 8, in Claim 7, before "the" insert -- wherein --.

In column 8, line 38, in Claim 27, before "the" insert -- wherein --.

Signed and Sealed this

Fifteenth Day of March, 2011

David J. Kappos
*Director of the United States Patent and Trademark Office*